United States Patent
Lei et al.

(10) Patent No.: US 11,652,576 B2
(45) Date of Patent: May 16, 2023

(54) METHOD AND APPARATUS FOR HARQ-ACK CODEBOOK DETERMINATION

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: LENOVO (BEIJING) LIMITED, Beijing (CN)

( * ) Notice: Subject to any disclaimer, the term of this patent is extended or adjusted under 35 U.S.C. 154(b) by 282 days.

(21) Appl. No.: 17/264,630

(22) PCT Filed: Aug. 1, 2018

(86) PCT No.: PCT/CN2018/098133
§ 371 (c)(1),
(2) Date: Jan. 29, 2021

(87) PCT Pub. No.: WO2020/024187
PCT Pub. Date: Feb. 6, 2020

(65) Prior Publication Data
US 2021/0314099 A1    Oct. 7, 2021

(51) Int. Cl.
*H04L 1/18* (2023.01)
*H04B 7/0456* (2017.01)
(Continued)

(52) U.S. Cl.
CPC ......... *H04L 1/1819* (2013.01); *H04B 7/0456* (2013.01); *H04L 1/1896* (2013.01); *H04W 74/0816* (2013.01)

(58) Field of Classification Search
CPC ... H04L 1/1812; H04L 1/1819; H04L 1/1896; H04B 7/0456; H04W 74/08; H04W 74/0808; H04W 74/0816
See application file for complete search history.

(56) References Cited

U.S. PATENT DOCUMENTS

| | | | | |
|---|---|---|---|---|
| 2018/0288790 A1* | 10/2018 | Kim | ........... | H04W 72/1278 |
| 2019/0159251 A1* | 5/2019 | Li | ........... | H04L 1/18 |

(Continued)

FOREIGN PATENT DOCUMENTS

| | | |
|---|---|---|
| CN | 108289015 A | 7/2018 |
| WO | 2017030417 A1 | 2/2017 |
| WO | 2017186174 A1 | 11/2017 |

OTHER PUBLICATIONS

Ericsson, "HARQ enhancements for NR-U", R1-1806255, 3GPP TSG-RAN WG1 Meeting #93, May 21-25, 2018, pp. 1-5.
(Continued)

*Primary Examiner* — Kent Krueger
(74) *Attorney, Agent, or Firm* — Kunzler Bean & Adamson (57) ABSTRACT

Method and apparatus for HARQ-ACK codebook determination are disclosed. One method of UE includes receiving one or more downlink transmissions; determining a first set of HARQ-AC feedback timing values for generating a first HARQ-ACK codebook; performing a first Listen-Before-Talk (LBT) for transmitting the first HARQ-ACK codebook in a first transmission opportunity, wherein the first HARQ-ACK codebook includes the HARQ-ACK feedback corresponding to the one or more downlink transmissions; transmitting the first HARQ-ACK codebook in the first transmission opportunity in response to the first LBT being successful; and determining a second set of HARQ-ACK feedback timing values for generating a second HARQ-ACK codebook and performing a second LBT for transmitting the second HARQ-ACK codebook in a second transmission opportunity in response to the first LBT being unsuccessful, wherein the second HARQ-ACK codebook includes the HARQ-ACK feedback corresponding to the one or more downlink transmissions.

18 Claims, 7 Drawing Sheets

(51) Int. Cl.
  *H04W 74/08* (2009.01)
  *H04L 1/1812* (2023.01)
  *H04L 1/1867* (2023.01)

(56) References Cited

U.S. PATENT DOCUMENTS

| | | | |
|---|---|---|---|
| 2019/0363840 A1* | 11/2019 | Wang | H04L 5/0055 |
| 2020/0195386 A1* | 6/2020 | Marinier | H04L 5/0091 |
| 2020/0295886 A1* | 9/2020 | Gou | H04L 1/1896 |
| 2020/0322947 A1* | 10/2020 | Baldemair | H04L 5/001 |
| 2021/0075556 A1* | 3/2021 | Karaki | H04B 7/0456 |
| 2021/0167900 A1* | 6/2021 | Karaki | H04L 1/1819 |
| 2021/0184801 A1* | 6/2021 | El Hamss | H04L 1/1854 |

OTHER PUBLICATIONS

Huawei Hisilicon, "HARQ enhancements in NR unlicensed", R1-1805918, Huawei, HiSilicon, 3GPP TSG RAN WG1 Meeting #93, May 21-25, 2018, pp. 1-5.

PCT/CN2018/098133, "International Search Report and the Written Opinion of the International Search Authority" ISA/CN, National Intellectual Property Administration, Office of the PRC China, Apr. 28, 2019, pp. 1-7.

* cited by examiner

METHOD AND APPARATUS FOR HARQ-ACK CODEBOOK DETERMINATION

FIELD

The subject matter disclosed herein relates generally to wireless communication and more particularly relates to Hybrid Automatic Repeat Request-Acknowledge ("HARQ-ACK") codebook determination.

BACKGROUND

The following abbreviations and acronyms are herewith defined, at least some of which are referred to within the following description.

Third Generation Partnership Project ("3GPP"), Downlink ("DL"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Positive Negative Acknowledgement ("HARQ-NACK"), Information Element ("IE"), Listen-Before-Talk ("LBT"), Licensed Assisted Access ("LAA"), Long Term Evolution ("LTE"), LTE Advanced ("LTE-A"), Master Information Block ("MIB"), Machine Type Communication ("MTC"), New Radio ("NR"), Physical Downlink Shared Channel ("PDSCH"), Physical Uplink Control Channel ("PUCCH"), Physical Uplink Shared Channel ("PUSCH"), Radio Resource Control ("RRC"), Receive ("RX"), System Information Block ("SIB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS").

The standardization of 5G NR has started and addresses a wide range of use-cases. The 5G application demands include, among others: very high data rates, support for a huge number of low-power devices, and mission-critical communications. The multitude of 5G use cases requires a variety of radio technologies. NR design supports operation in both traditional licensed frequency spectrum bands as well as unlicensed frequencies. For example, in dense environments, technologies based on unlicensed frequencies coupled with core networks can increase the access network capacity and benefit users' wireless experience.

Particularly, in 3GPP Rel-15 TS38.213, semi-static HARQ-ACK codebook size determination is named Type 1 HARQ-ACK codebook determination while dynamic HARQ-ACK codebook size determination is named Type 2 HARQ-ACK codebook determination. Although semi-static HARQ-ACK codebook leads to larger overhead, it can guarantee that both gNB and UE have the same knowledge on the HARQ-ACK codebook size. Thus, with regard to semi-static HARQ-ACK codebook determination defined in NR, both gNB and UE should have the same knowledge on a set of HARQ-ACK feedback timing values, which is also referred to as a set of KI.

In LTE LAA, HARQ-ACK feedback is transmitted on PUCCH or PUSCH on a licensed carrier. However, with regard to NR access on an unlicensed spectrum, HARQ-ACK feedback needs to be transmitted on an unlicensed carrier in one or more of following scenarios: Dual-connectivity ("DC"), Carrier Aggregation ("CA") and standalone deployment, which have been included in the target deployment scenarios for NR access on an unlicensed spectrum ("NR-U").

HARQ-ACK transmission on an unlicensed carrier suffers potential interference from hidden nodes such as WiFi Access Points ("AP"). Thus, LBT testing is required before the transmission of a HARQ-ACK codebook. Techniques to handle reduced HARQ-ACK feedback transmission opportunities for a given HARQ process due to LBT failure are identified as beneficial. Particularly, in the case that UL HARQ feedback is transmitted on an unlicensed band, NR-U should consider mechanisms to support flexible triggering and multiplexing of HARQ feedback for one or more DL HARQ processes.

BRIEF SUMMARY

An attempt for transmission of UL HARQ-ACK codebook on unlicensed frequencies may have a high failure. To solve this problem, multiple transmission opportunities for the HARQ-ACK codebook contributes to decrease DL retransmission. In another aspect, HARQ-ACK codebook in different transmission opportunity should include feedbacks for DL transmissions which have not been responded with HARQ-ACK by UE, otherwise these DL transmissions need to be retransmitted. Thus, a mechanism for determination of HARQ-ACK codebook is required.

Method and apparatus for HARQ-ACK codebook determination are disclosed. One method proposed for UE includes receiving one or more downlink transmissions; determining a first set of HARQ-ACK feedback timing values for generating a first HARQ-ACK codebook; performing a first Listen-Before-Talk (LBT) for transmitting the first HARQ-ACK codebook in a first transmission opportunity, wherein the first HARQ-ACK codebook includes the HARQ-ACK feedback corresponding to one or more downlink transmissions; transmitting the first HARQ-ACK codebook in the first transmission opportunity in response to the first LBT being successful; and determining a second set of HARQ-ACK feedback timing values for generating a second HARQ-ACK codebook and performing a second LBT for transmitting the second HARQ-ACK codebook in a second transmission opportunity in response to the first LBT being unsuccessful, wherein the second HARQ-ACK codebook includes the HARQ-ACK feedback corresponding to the one or more downlink transmissions.

Further, the second HARQ-ACK codebook is the same as the first HARQ-ACK codebook and the codebook size is determined based on the size of the first set of HARQ-ACK feedback timing values and the number of transmission opportunities for the HARQ-ACK feedback.

The method and apparatus herein not only provides a mechanism for multiple transmission opportunities for HARQ-ACK codebook, but also considers DL transmissions which have not been responded to with HARQ-ACK/NACK in early transmission opportunities. Thus, the method and apparatus herein contribute to decreased DL retransmission.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to be limiting in scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements of a mechanism for the determination of HARQ-ACK codebook should be studied to provide multiple transmission opportunities for the HARQ-ACK codebook and moreover include HARQ-ACK feedback for DL transmissions which have not been responded to with HARQ-ACK/NACK in early transmission opportunities, which is helpful to decrease DL retransmission, especial in the scenario of NR-U.

HARQ-ACK codebook includes the HARQ-ACK feedback corresponding to the one or more downlink transmissions. The items of HARQ-ACK codebook and HARQ-ACK feedback can be used alternatively in the present application. It should be understood that the terms HARQ-ACK codebook and/or HARQ-ACK feedback not only includes positive acknowledgement for the corresponding DL transmission based on HARQ, but also includes a response indicating negative acknowledgement ("NACK") and/or discontinuous transmission ("DTX") for the same.

In the present application, the set of HARQ-ACK feedback timing values indicates an offset between UL parts carrying HARQ-ACK codebook and DL parts that the HARQ-ACK codebook is directed to. For example, with regard to a set of HARQ-ACK feedback timing values $\{1, 2, \ldots, 8\}$, HARQ-codebook transmitted in UL slot 8 includes feedbacks for DL slots 0-7.

Figure 1:
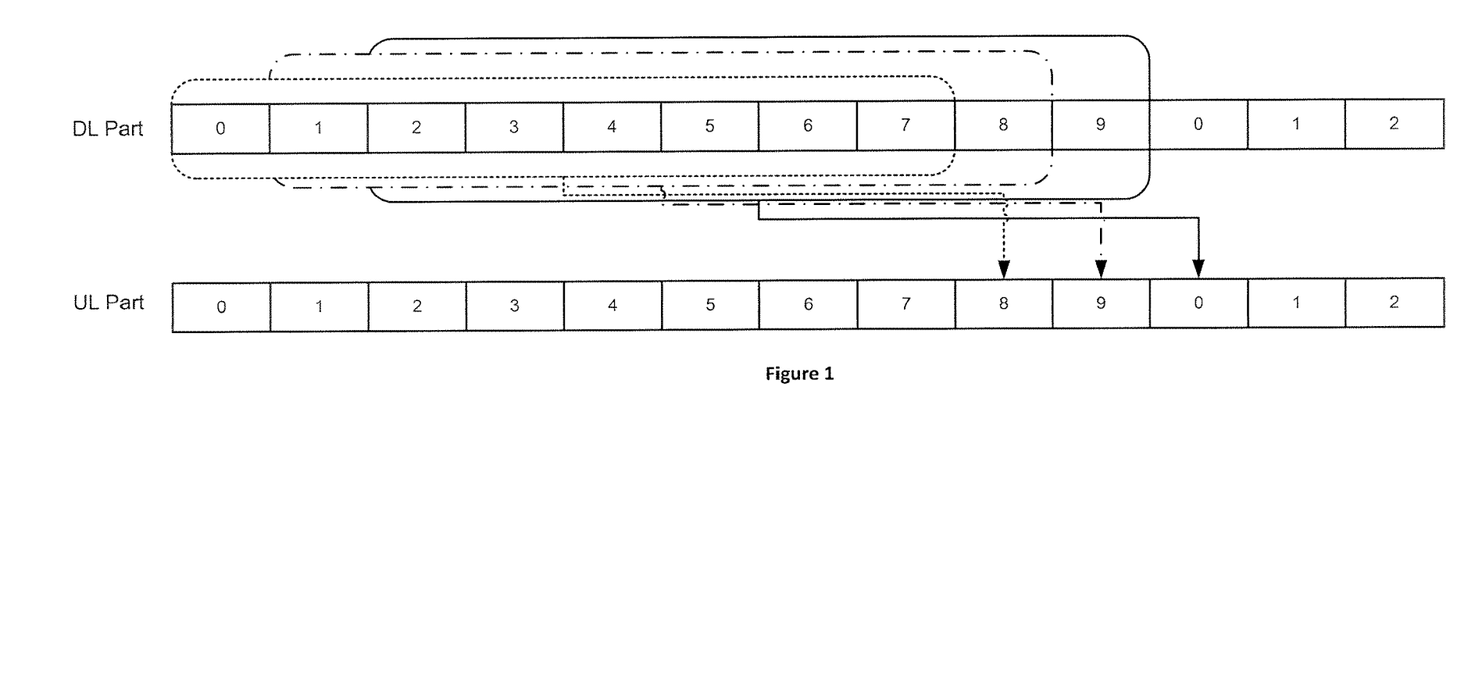
FIG. 1 is a schematic diagram illustrating a determination of HARQ-ACK codebook according to a first embodiment.

FIG. 1 is a schematic diagram illustrating a determination of HARQ-ACK codebook according to a first embodiment. FIG. 1 shows a basic principle for the enhancement of HARQ-ACK codebook transmission in NR-U, that is, multiple transmission opportunities for HARQ-ACK codebook are provided. Transmission opportunities can be explained according to transmission resource configuration. In one embodiment, multiple transmission opportunities can be explained as multiple symbols, slots, subframes etc in time domain. In another embodiment, multiple transmission opportunities can be explained as multiple carriers, subband, PRBs in frequency domain or carrier domain.

As shown in FIG. 1, UL parts 8, 9, 0 (e.g. UL slots 8, 9, 0) are three transmission opportunities for a given HARQ-ACK codebook corresponding to the downlink association set. That is, UL parts 8, 9, 0 are included in the HARQ-ACK feedback window. In one embodiment, a number of the transmission opportunities are configured by gNB through a higher layer signaling such as a RRC message.

Particularly, UE performs the LBT testing for UL part 8 which is the first transmission opportunity. In response to the LBT testing being successful for UL part 8 (e.g. UL slot 8), UE determines a first set of HARQ-ACK feedback timing values to be a set of $\{0, 1, 2, \ldots, 7\}$, and transmits the first HARQ-ACK codebook including HARQ-ACK feedbacks corresponding to DL transmissions in DL parts 0-7 (e.g. DL slots 0-7), which is shown in the dashed line in FIG. 1. In another aspect, in response to the LBT testing being unsuccessful for UL part 8, UE performs a second LBT test for UL part 9 (e.g. UL slot 9). In response to the LBT testing being successful for UL part 9, UE determines a second set of HARQ-ACK feedback timing values to be a set of $\{1, 2, \ldots, 8\}$, and transmits the second HARQ-ACK codebook including HARQ-ACK feedbacks corresponding to DL transmissions in DL parts 1-8 (e.g. DL slots 1-8), which is shown in the dash-dotted line in FIG. 1. That is, the feedback for DL transmission in DL part 0 are not included in the second HARQ-ACK codebook. Similar, in the case that the LBT testing is still unsuccessful for UL part 9, UE performs a third LBT testing for UL part 0 (e.g. UL slot 0). In response to the LBT testing being successful for UL part 0, UE determines a third set of HARQ-ACK feedback timing values to be a set of $\{2, 3, \ldots, 9, 0\}$, and transmits the third HARQ-ACK codebook including HARQ-ACK feedbacks corresponding to DL transmissions in DL parts 2-0 (e.g. DL slots 2-0), which is shown in the solid line in FIG. 1. That is, the feedbacks for DL transmission in DL part 0-1 are not included in the third HARQ-ACK codebook.

In summary, from the perspective of gNB, the first several DL transmissions may not be given feedback by the received HARQ-ACK codebook. In that case, gNB may retransmit the first several DL transmissions, which downgrades DL performance.

In the present application, three embodiments for improving HARQ-ACK codebook determination are disclosed. Particularly, the problem that feedback for the DL transmissions is dropped and resolved in the HARQ-ACK codebook, especially in the case of NR-U.

Figure 2:
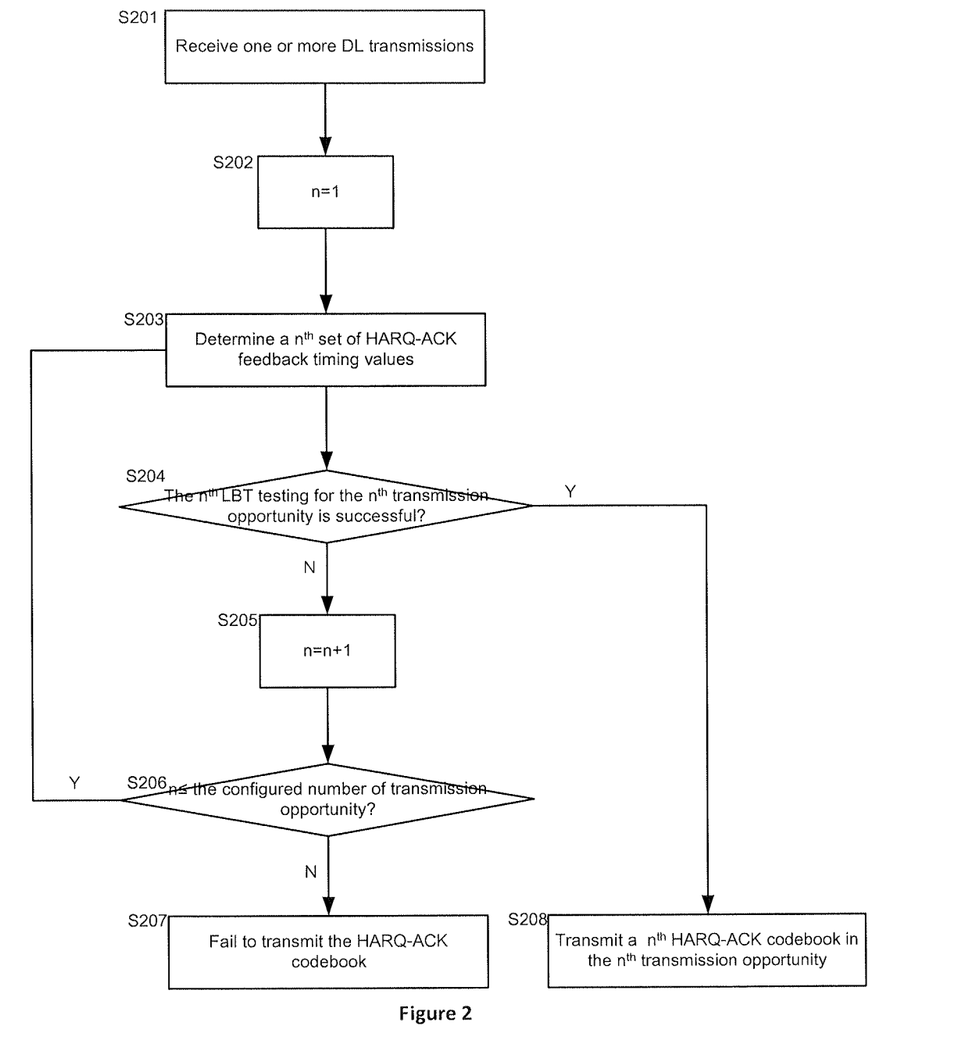
FIG. 2 is a call flow illustrating a determination of HARQ-ACK codebook according to a second embodiment.
Figure 5:
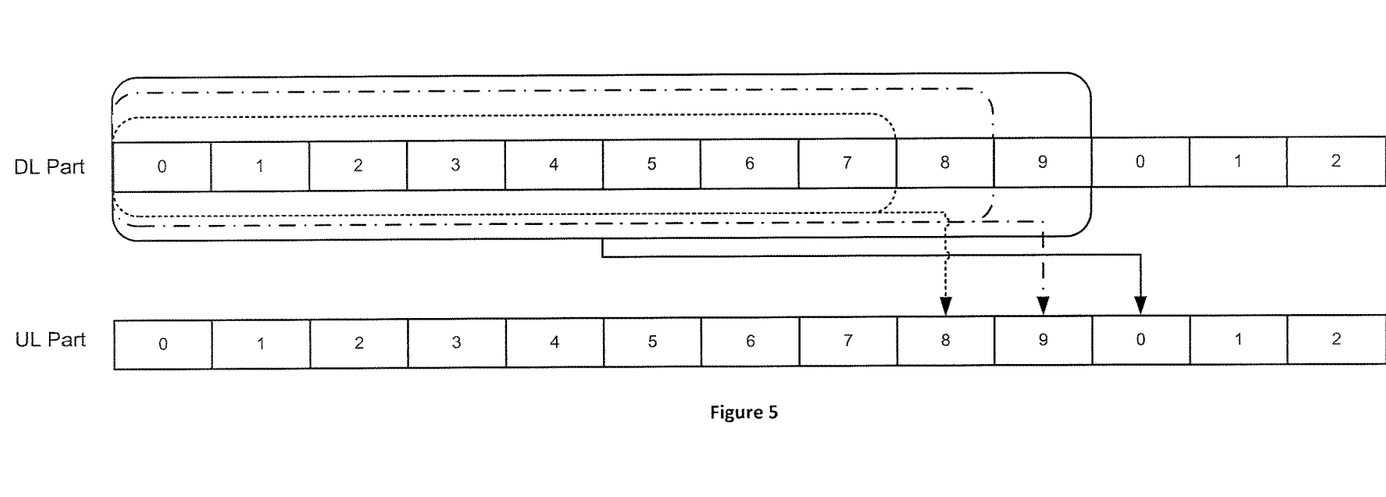
FIG. 5 is a schematic diagram illustrating a determination of HARQ-ACK codebook according to the second/third embodiment.

FIG. 2 is a call flow illustrating a determination of HARQ-ACK codebook according to a second embodiment, and FIG. 5 is a schematic diagram illustrating a determination of HARQ-ACK codebook according to the second embodiment.

As shown in FIG. 2, in step S201, UE receives one or more DL transmissions.

Further, the first transmission opportunity for the first HARQ-ACK codebook is indicated to UE by DCI from gNB. In one embodiment, gNB may indicate a three-bit PDSCH-to-HARQ feedback timing field in DCI format 1_0 or 1_1, which indicates a time offset between the DL transmission and the first HARQ-ACK transmission opportunity. Particularly, a value in the set of HARQ-ACK feedback timing values is selected as the value of the three-bit PDSCH-to-HARQ_feedback timing field. For example, DCI may indicate the three-bit PDSCH-to-HARQ_feedback timing field to be 8, which means DL transmissions on DL part 0 may have HARQ-ACK feedback in UL part 8.

In another aspect, the first set of HARQ-ACK feedback timing values and/or the number of transmission opportunities for the HARQ-ACK codebook are configured by gNB via RRC signaling.

In step S202, UE sets the counter for attempting to transmit the HARQ-ACK codebook to be 1. As shown in the dashed line in FIG. 5, UL part 8 (e.g. UL slot 8) is indicated to be the first transmission opportunity for the HARQ-ACK codebook by gNB.

In step S203, UE determines the first set of HARQ-ACK feedback timing values according to the configuration from gNB. For example, the first set of HARQ-ACK feedback timing values is a set of $\{1, 2, \ldots, 8\}$, which indicates the HARQ-ACK transmitted in slot n includes HARQ-ACK feedback for the DL transmissions in slot n−8, n−7, ..., n−1. For example, with regard to HARQ-ACK transmission in slot 8, the HARQ-ACK feedback corresponding to the DL transmissions in slot 0, 1, ..., 7 are included in a same HARQ-ACK codebook.

In step S204, UE performs the first LBT testing for UL part 8. In the case that the first LBT testing for UL part 8 is successful, the procedure continues to step S208, in which UE transmits the first HARQ-ACK codebook, which includes feedbacks for the DL transmission in DL parts 0-7 (e.g. DL slots 0-7) in the first transmission opportunity. Correspondingly, gNB receives the HARQ-ACK codebook from the first transmission opportunity, i.e. UL slot 8, and learns the HARQ-ACK feedback for DL transmission in DL parts 0-7 (e.g. DL slots 0-7).

In the case that the first LBT testing for UL part 8 is unsuccessful, the procedure continues to step S205, in which the counter for attempting to transmit the HARQ-ACK codebook is increased by 1.

In step S206, UE determines whether the counter for attempting to transmit the HARQ-ACK codebook is less than or equal to the configured number of transmission opportunities. For example, in the case that the number of transmission opportunities for HARQ-ACK codebook is set to be 4 by gNB in RRC signaling, the procedure will return to step S203 in response to the first attempt to transmit the HARQ-ACK codebook being unsuccessful.

Again, in step 203, UE starts the second attempt for transmission of the HARQ-ACK codebook. As shown in the dash-dotted line in FIG. 5, UL part 9 (e.g. UL slot 9) is used as the second transmission opportunity for the HARQ-ACK codebook. UE determines/updates the second set of HARQ-ACK feedback timing values according to the first set of HARQ-ACK feedback timing values. In one embodiment, the second set of HARQ-ACK feedback timing values is updated by inserting additional values into the first set of HARQ-ACK feedback timing values. In a preferred embodiment, assuming an (slot) offset between two consecutive transmission opportunities for the HARQ-ACK codebook has a value of 'a', which may be configured by gNB via RRC signaling, the $(n+1)^{th}$ set of HARQ-ACK feedback timing values is updated by inserting the values of $\{x+1, x+2, \ldots, x+a\}$ in the $n^{th}$ set of HARQ-ACK feedback timing values, wherein x is the maximum value in the $n^{th}$ set. With regard to the second set of HARQ-ACK feedback timing values, assuming the first set of HARQ-ACK feedback timing values is a set of $\{1, 2, \ldots, 8\}$ as configured by gNB and 'a' has a value of 1, then the second set of HARQ-ACK feedback timing values is a set of $\{1, 2, \ldots, 9\}$; assuming the first set of HARQ-ACK feedback timing values is a set of $\{1, 2, \ldots, 8\}$ as configured by gNB and 'a' has a value of 2, then the second set of HARQ-ACK feedback timing values is a set of $\{1, 2, \ldots 9, 10\}$.

Again in step S204, UE performs the second LBT testing for UL part 9. In the case that the second LBT testing for UL part 9 is successful, the procedure continues to step S208, in which UE transmits the second HARQ-ACK codebook, which includes feedbacks for the DL transmission in DL parts 0-8 (e.g. DL slots 0-8) in the second transmission opportunity. Correspondingly, gNB receives the HARQ-ACK codebook from the second transmission opportunity, i.e. UL slot 9, determines the second set of HARQ-ACK feedback timing values according to the transmitted first set of HARQ-ACK feedback timing values, and learns the HARQ-ACK feedback for DL transmission in DL parts 0-8 (e.g. DL slots 0-8).

Otherwise in the case that the second LBT testing for UL part 9 is unsuccessful, UE increases the counter for attempting to transmit the HARQ-ACK codebook by 1 in the step S205, and then determines whether the counter is less than or equal to the configured number of transmission opportunities in step S206.

Similar with the above descriptions, UE keeps on determining/updating a $n^{th}$ set of HARQ-ACK feedback timing values according to the $(n-1)^{th}$ set and performing the LBT testing in the $n^{th}$ transmission opportunity, and then transmitting the $n^{th}$ HARQ-ACK codebook in the $n^{th}$ transmission opportunity in response to the LBT testing in the $n^{th}$ transmission opportunity being successful. Or if the LBT testing is unsuccessful when the counter for attempting to transmit the HARQ-ACK codebook is larger than the configured number of transmission opportunities in step S206, the procedure continues to step S207, in which UE fails to transmit the HARQ-ACK codebook.

Figure 3:
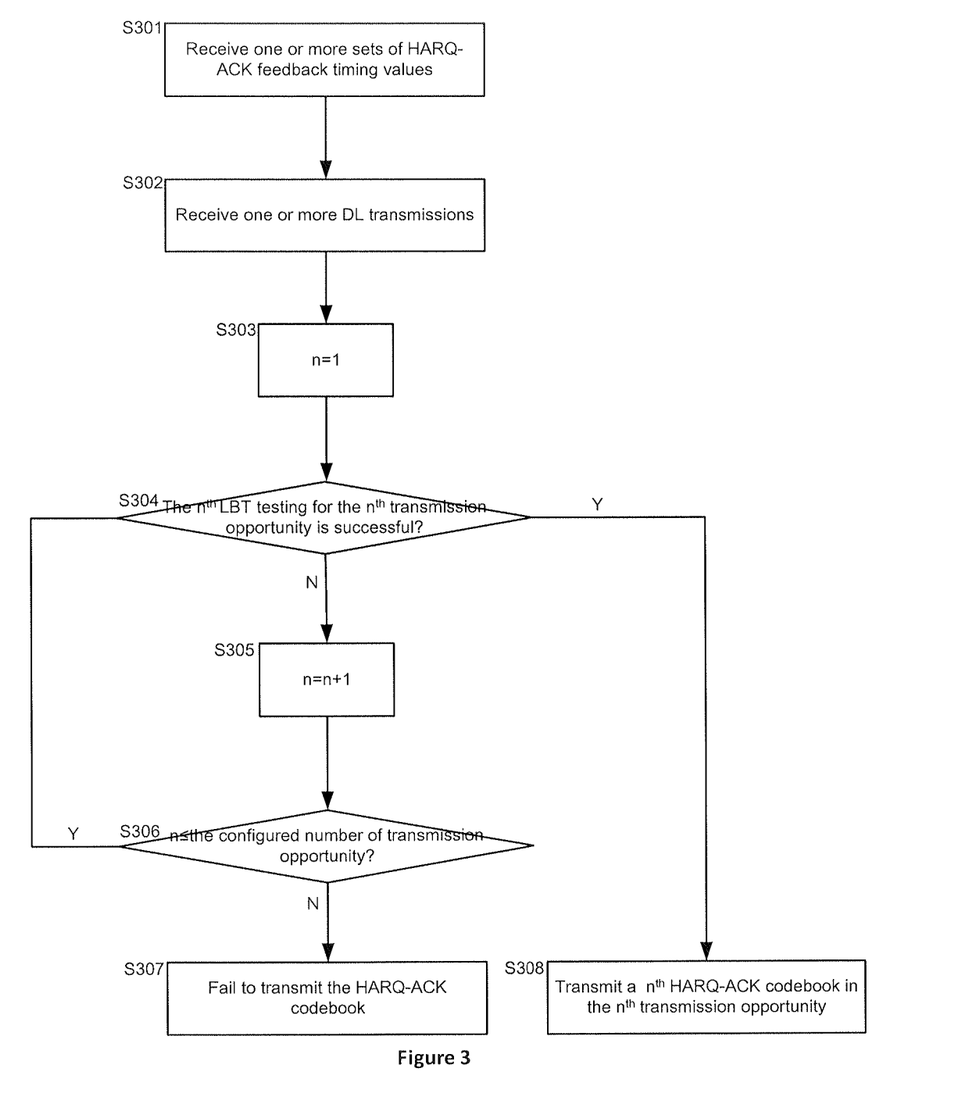
FIG. 3 is a call flow illustrating a determination of HARQ-ACK codebook according to a third embodiment.

FIG. 3 is a call flow illustrating a determination of HARQ-ACK codebook according to a third embodiment, and FIG. 5 is a schematic diagram also illustrating a determination of HARQ-ACK codebook according to the third embodiment. The difference between the embodiment illustrated in FIG. 2 and that illustrated in FIG. 3 is in that, not only the first of HARQ-ACK feedback timing values but other sets of HARQ-ACK feedback timing values are configured by gNB via RRC signaling.

In step S301, UE receives multiple sets of HARQ-ACK feedback timing values and/or the number of transmission opportunities for the HARQ-ACK codebook from gNB via RRC signaling.

In step S302, UE receives one or more DL transmissions.

Further, the first transmission opportunity for the first HARQ-ACK codebook is indicated to UE by DCI from gNB. In one embodiment, gNB may indicate a three-bit PDSCH-to-HARQ_feedback timing field in DCI format 1_0 or 1_1, which indicates a time offset between the DL transmission and the first HARQ-ACK transmission opportunity. Particularly, a value in the set of HARQ-ACK feedback timing values is selected as the value of the three-bit PDSCH-to-HARQ_feedback timing field. For example, DCI may indicate the three-bit PDSCH-to-HARQ_feedback timing field to be 8, which means DL transmissions on DL part 0 may have HARQ-ACK feedback in UL part 8.

In step S303, UE sets the counter for attempting to transmit the HARQ-ACK codebook to be 1. As shown in the dashed line in FIG. 5, UL part 8 (e.g. UL slot 8) is indicated to be the first transmission opportunity for the HARQ-ACK codebook by gNB.

In step S304, UE performs the first LBT testing for UL part 8. In the case that the first LBT testing for UL part 8 is successful, the procedure continues to step S308, in which UE transmits the first HARQ-ACK codebook, which includes feedback for the DL transmission in DL parts 0-7

(e.g. DL slots 0-7) in the first transmission opportunity. Correspondingly, gNB receives the HARQ-ACK codebook from the first transmission opportunity, i.e. UL slot 8, and learns the HARQ-ACK feedback for DL transmission in DL parts 0-7 (e.g. DL slots 0-7).

In the case that the first LBT testing for UL part 8 is unsuccessful, the procedure continues to step S305, in which the counter for attempting to transmit the HARQ-ACK codebook is increased by 1.

In step S306, UE determines whether the counter for attempting to transmit the HARQ-ACK codebook is less than or equal to the configured number of transmission opportunities. For example, in the case that the number of transmission opportunities for HARQ-ACK codebook is set to 4 by gNB in RRC signaling, the procedure will return to step S304 in response to the first attempt to transmit the HARQ-ACK codebook being unsuccessful.

Again, in step 304, UE starts a second attempt for transmission of the HARQ-ACK codebook. UE performs the second LBT testing for UL part 9. In the case that the second LBT testing for UL part 9 is successful, the procedure continues to step S308, in which UE transmits the second HARQ-ACK codebook, which includes feedbacks for the DL transmission in DL parts 0-8 (e.g. DL slots 0-8), in the second transmission opportunity. Correspondingly, gNB receives the HARQ-ACK codebook from the second transmission opportunity, i.e. UL slot 9, and learns the HARQ-ACK feedback for DL transmission in DL parts 0-8 (e.g. DL slots 0-8) according to the second set of HARQ-ACK feedback timing values.

Otherwise in the case that the second LBT testing for UL part 9 is unsuccessful, UE increases the counter for attempting to transmit the HARQ-ACK codebook by 1 in step S305, and then determines whether the counter is less than or equal to the configured number of transmission opportunities in step S306.

Similar with the above descriptions, UE keeps on performing the LBT testing in the $n^{th}$ transmission opportunity, and then transmits the $n^{th}$ HARQ-ACK codebook in the $n^{th}$ transmission opportunity in response to the LBT testing in the $n^{th}$ transmission opportunity being successful. Or if the LBT testing is still unsuccessful when the counter for attempting to transmit the HARQ-ACK codebook is larger than the configured number of transmission opportunities in step S306, the procedure continues to step S307 in which UE fails to transmit the HARQ-ACK codebook.

Similar with the second embodiment illustrated in FIG. 2, among the multiple sets of HARQ-ACK feedback timing values configured by gNB, the $(n+1)^{th}$ set of HARQ-ACK feedback timing values is the union set of the $n^{th}$ set of HARQ-ACK feedback timing values and the set of $\{x+1, x+2, \ldots, x+a\}$, wherein x is the maximum value in the $n^{th}$ set and 'a' is an (slot) offset between two consecutive transmission opportunities for the HARQ-ACK feedback. For example, with regard to the second set of HARQ-ACK feedback timing values, assuming the first set of HARQ-ACK feedback timing values is a set of $\{1, 2, \ldots, 8\}$ as configured by gNB and 'a' has a value of 1, then the second set of HARQ-ACK feedback timing values is a set of $\{1, 2, \ldots, 9\}$. Assuming the first set of HARQ-ACK feedback timing values is a set of $\{1, 2, \ldots, 8\}$ as configured by gNB and 'a' has a value of 2, then the second set of HARQ-ACK feedback timing values is a set of $\{1, 2, \ldots 9, 10\}$.

Figure 4:
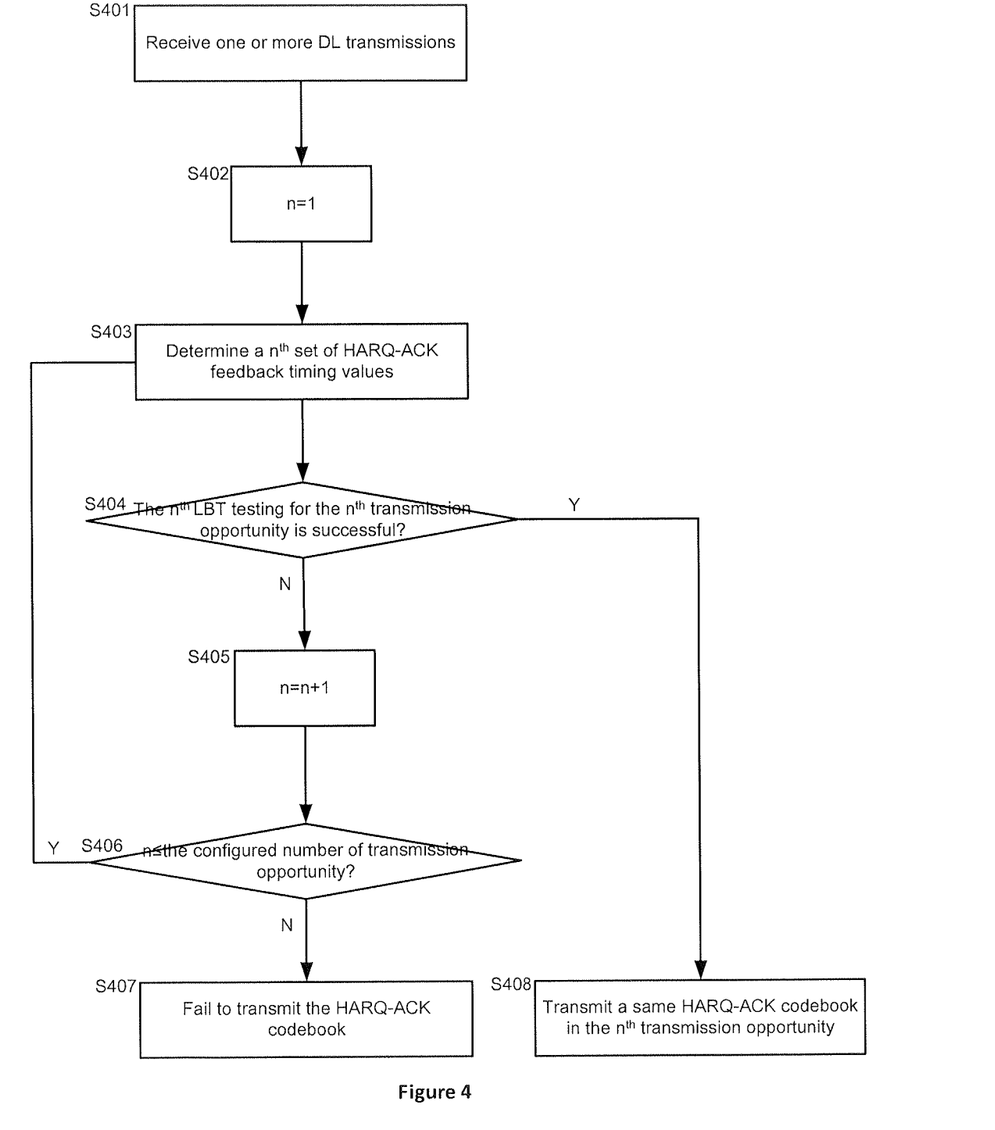
FIG. 4 is a call flow illustrating a determination of HARQ-ACK codebook according to a fourth embodiment.
Figure 6:
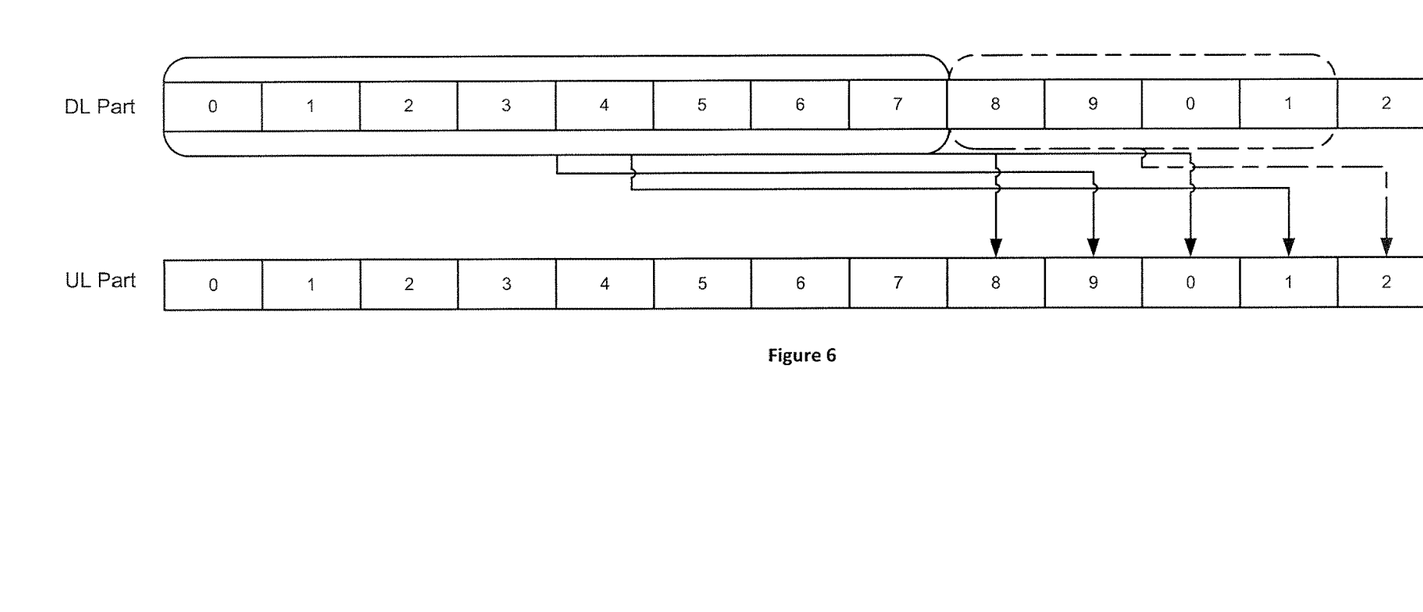
FIG. 6 is a schematic diagram illustrating a determination of HARQ-ACK codebook according to the fourth embodiment.

FIG. 4 is a call flow illustrating a determination of HARQ-ACK codebook according to a fourth embodiment, and FIG. 6 is a schematic diagram illustrating a determination of HARQ-ACK codebook according to the fourth embodiment. The difference between the embodiment illustrated in FIG. 2 or 3 and that illustrated in FIG. 4 is in that, the size of HARQ-ACK codebook remains unchanged for different transmission opportunities, which contributes to saved process capacity for UE.

In step S401, UE receives one or more DL transmissions.

Further, the first transmission opportunity for the first HARQ-ACK codebook is indicated to UE by DCI from gNB. In one embodiment, gNB may indicate a three-bit PDSCH-to-HARQ_feedback timing field in DCI format 1_0 or 1_1, which indicates a time offset between the DL transmission and the first transmission opportunity. Particularly, a value in the set of HARQ-ACK feedback timing values is selected as the value of the three-bit PDSCH-to-HARQ_feedback timing field. For example, DCI may indicate the three-bit PDSCH-to-HARQ_feedback timing field to be 8, which means DL transmissions on DL part 0 may have a HARQ-ACK feedback in UL part 8.

In step S402, UE sets the counter for attempting to transmit the HARQ-ACK codebook to be 1. As shown in the dashed line in FIG. 6, UL part 8 (e.g. UL slot 8) is indicated to be the first transmission opportunity for the HARQ-ACK codebook by gNB.

In step S403, UE determines the first set of HARQ-ACK feedback timing values according to the configuration from gNB. In one embodiment, the first set of HARQ-ACK feedback timing values and/or the number of transmission opportunities for the HARQ-ACK codebook are configured by gNB via RRC signaling. For example, the first set of HARQ-ACK feedback timing values is a set of $\{1, 2, \ldots 8\}$, which indicates the HARQ-ACK transmitted in the UL part 8 which is the first transmission opportunity includes feedbacks for the DL transmissions in DL parts 0-7.

In step S404, UE performs the first LBT testing for UL part 8 which is the first transmission opportunity for the HARQ-ACK codebook. In the case that the first LBT testing for UL part 8 is successful, the procedure continues to step S408, in which UE transmits the first HARQ-ACK codebook, which includes feedback for the DL transmission in DL parts 0-7 (e.g. DL slots 0-7) in the first transmission opportunity. Correspondingly, gNB receives the HARQ-ACK codebook from the first transmission opportunity, i.e. UL slot 8, and learns the HARQ-ACK feedback for DL transmission in DL parts 0-7 (e.g. DL slots 0-7).

In one embodiment, the codebook size is determined based on the size of the first set of HARQ-ACK feedback timing values as mentioned above and the number of transmission opportunities for the HARQ-ACK feedback. For example, as shown in FIG. 6, assuming the number of transmission opportunities for the HARQ-ACK feedback is 4 (UL part 8, 9, 0 and 1), then the codebook size and/or the set of HARQ-ACK feedback timing values is 11, which considers the size of the first set of HARQ-ACK feedback timing values (i.e. the size of the first set is 8). In another aspect, the first eight values in the HARQ-ACK codebook indicate the feedbacks for DL transmissions in DL parts 0-7 (e.g. DL slots 0-7), and the later three values in the HARQ-ACK codebook may be default values such as NACK or DTX for reserved use.

However, it should be understood that the codebook size can be determined based on the size of the first set of HARQ-ACK feedback timing values. That is, the codebook size is the same with the size of the first set of HARQ-ACK feedback timing values.

In the case that the first LBT testing for UL part 8 is unsuccessful, the procedure continues to step S405, in which the counter for attempting to transmit the HARQ-ACK codebook is increased by 1.

In step S406, UE determines whether the counter for attempting to transmit the HARQ-ACK codebook is less than or equal to the configured number of transmission opportunities. For example, in the case that the number of transmission opportunity for HARQ-ACK codebook is set to be 4 by gNB in RRC signaling, the procedure will returns to step S403 in response to the first attempt to transmit the HARQ-ACK codebook being unsuccessful.

Again, in step 403, UE starts a second attempt for transmission of the HARQ-ACK codebook. As shown in the dash-dotted line in FIG. 6, UL part 9 (e.g. UL slot 9) is used as the second transmission opportunity for the HARQ-ACK codebook. In one embodiment, UE determines/updates the second set of HARQ-ACK feedback timing values according to the first set of HARQ-ACK feedback timing values. Further, the second set of HARQ-ACK feedback timing values is determined by increasing an additional value for the HARQ-ACK feedback timing values in the first set. In a preferred embodiment, assuming an (slot) offset between two consecutive transmission opportunities for the HARQ-ACK codebook has a value of 'a', which may be configured by gNB via RRC signaling, the $(n+1)^{th}$ set of HARQ-ACK feedback timing values is determined by increasing a value of 'a' for the HARQ-ACK feedback timing values in the $n^{th}$ set. Assuming the first set of HARQ-ACK feedback timing values is a set of $\{1, 2, \ldots, 8\}$ as configured by gNB and 'a' has a value of 1, then the second set of HARQ-ACK feedback timing values is a set of $\{2, 3, \ldots, 9\}$; assuming the first set of HARQ-ACK feedback timing values is a set of $\{1, 2, \ldots, 8\}$ as configured by gNB and 'a' has a value of 2, then the second set of HARQ-ACK feedback timing values is a set of $\{3, 4, \ldots, 10\}$.

Again in step S404, UE performs the second LBT testing for UL part 9. In the case that the second LBT testing for UL part 9 is successful, the procedure continues to step S408, in which UE transmits the second HARQ-ACK codebook, which is the same as the first HARQ-ACK codebook in the second transmission opportunity. Correspondingly, gNB receives the HARQ-ACK codebook from the second transmission opportunity, i.e. UL slot 9, determines the second set of HARQ-ACK feedback timing values according to the transmitted first set of HARQ-ACK feedback timing values and learns the HARQ-ACK feedback for DL transmission in DL parts 0-7 (e.g. DL slots 0-7).

Otherwise in the case that the second LBT testing for UL part 9 is unsuccessful, UE increases the counter for attempting to transmit the HARQ-ACK codebook by 1 in step S405, and then determines whether the counter is less than or equal to the configured number of transmission opportunities in step S406.

Similar with the above descriptions, UE keeps on determining/updating a $n^{th}$ set of HARQ-ACK feedback timing values according to the $(n-1)^{th}$ set and performing the LBT testing in the $n^{th}$ transmission opportunity, and then transmits the same HARQ-ACK codebook in the $n^{th}$ transmission opportunity in response to the LBT testing in the $n^{th}$ transmission opportunity being successful. Or if the LBT testing is still unsuccessful when the counter for attempting to transmit the HARQ-ACK codebook is larger than the configured number of transmission opportunities in step S406, the procedure continues to step S407 in which UE fails to transmit the HARQ-ACK codebook.

In one embodiment, in order to give UE more time to prepare HARQ-ACK feedback for the DL transmissions in DL parts 8, 9 and 0 (surrounded by the long-short line), which are excluded from the DL parts that the above HARQ-ACK coded is directed to, a transmission opportunity after the configured transmission opportunities (e.g. UL part 2 pointed by the long-short line in FIG. 6) is used to transmit a HARQ-ACK codebook for these DL transmissions.

In another aspect, the first set of HARQ-ACK feedback timing values is not limited to be the set of $\{1, 2, \ldots, 8\}$. For example, a set of $\{2, 3, \ldots, 9\}$ can be used as the first set of HARQ-ACK feedback timing values. In that case, UL part 9 is used to carry HARQ-ACK codebook for DL transmissions in DL parts 0-7. In another word, UE may have more time to prepare the transmission of HARQ-ACK codebook.

One skilled in the relevant art will recognize, however, that the process described in FIGS. 2-4 does not need to be practiced in the sequence shown in the Figures and may be practiced without one or more of the specific steps, or with other steps not shown in the Figures.

Figure 7:
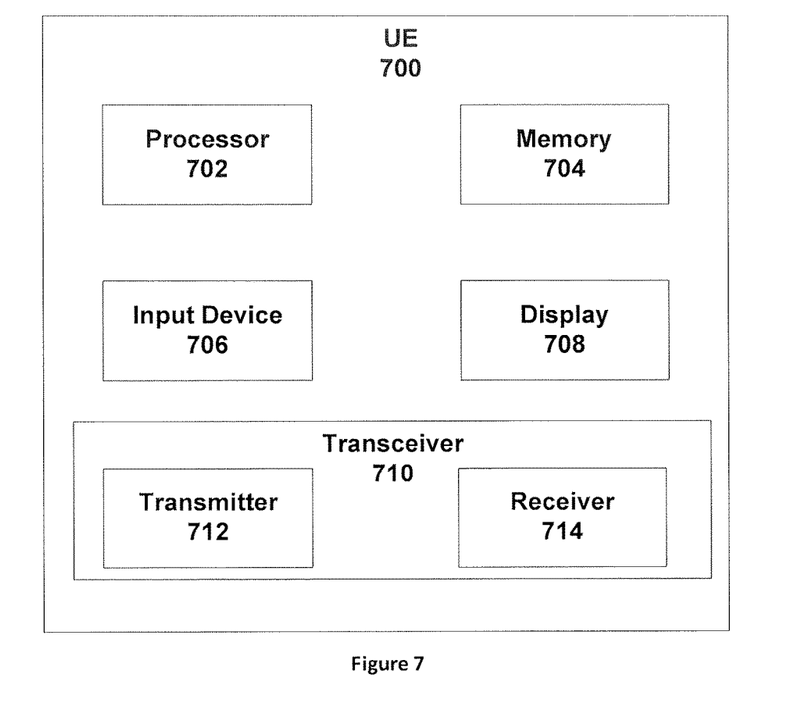
FIG. 7 is a schematic block diagram illustrating components of a UE such as aerial UE according to one embodiment.

FIG. 7 is a schematic block diagram illustrating components of a UE such as aerial vehicle according to one embodiment.

UE700 is an embodiment of the UE described from FIG. 1 to FIG. 6. Furthermore, UE 700 may include a processor 702, a memory 704, and a transceiver 710. In some embodiments, UE 700 may include an input device 706 and/or a display 708. In certain embodiments, the input device 706 and the display 708 may be combined into a single device, such as a touch screen.

The processor 702, in one embodiment, may include any known controller capable of executing computer-readable instructions and/or capable of performing logical operations. For example, the processor 702 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 702 executes instructions stored in the memory 704 to perform the methods and routines described herein. The processor 702 is communicatively coupled to the memory 704, the input device 706, the display 708, and the transceiver 710.

In some embodiments, the processor 702 controls the transceiver 710 to transmit a HARQ-ACK codebook including feedbacks for one or more DL transmissions to Network Equipment 800 and/or receive various configuration from Network Equipment 800, such as the first transmission opportunity for the first HARQ-ACK codebook, the number of transmission opportunities, one or more sets of HARQ-ACK feedback timing values. In certain embodiments, the processor 702 may monitor DL signals received via the transceiver 710 for specific messages.

The memory 704, in one embodiment, is a computer readable storage medium. In some embodiments, the memory 704 includes volatile computer storage media. For example, the memory 704 may include a RAM, including dynamic RAM ("DRAM"), synchronous dynamic RAM ("SDRAM"), and/or static RAM ("SRAM"). In some embodiments, the memory 704 includes non-volatile computer storage media. For example, the memory 704 may include a hard disk drive, a flash memory, or any other suitable non-volatile computer storage device. In some embodiments, the memory 704 includes both volatile and non-volatile computer storage media. In some embodiments, the memory 704 stores data relating to trigger conditions for transmitting the measurement report to Network Equipment 800. In some embodiments, the memory 704 also stores program code and related data, such as an operating system or other controller algorithms operating on UE 700.

UE 700 may optionally include an input device 706. The input device 706, in one embodiment, may include any known computer input device including a touch panel, a button, a keyboard, a stylus, a microphone, or the like. In some embodiments, the input device 706 may be integrated with the display 708, for example, as a touch screen or similar touch-sensitive display. In some embodiments, the input device 706 includes a touch screen such that text may be input using a virtual keyboard displayed on the touch screen and/or by handwriting on the touch screen. In some embodiments, the input device 706 includes two or more different devices, such as a keyboard and a touch panel. In certain embodiments, the input device 706 may include one or more sensors for monitoring an environment of UE 700.

UE 700 may optionally include a display 708. The display 708, in one embodiment, may include any known electronically controllable display or display device. The display 708 may be designed to output visual, audible, and/or haptic signals. In some embodiments, the display 708 includes an electronic display capable of outputting visual data to a user. For example, the display 708 may include, but is not limited to, an LCD display, an LED display, an OLED display, a projector, or a similar display device capable of outputting images, text, or the like to a user. As another, non-limiting, example, the display 708 may include a wearable display such as a smart watch, smart glasses, a heads-up display, or the like. Further, the display 708 may be a component of a smart phone, a personal digital assistant, a television, a table computer, a notebook (laptop) computer, a personal computer, a vehicle dashboard, or the like.

In certain embodiments, the display 708 may include one or more speakers for producing sound. For example, the display 708 may produce an audible alert or notification (e.g., a beep or chime). In some embodiments, the display 708 includes one or more haptic devices for producing vibrations, motion, or other haptic feedback. In some embodiments, all or portions of the display 708 may be integrated with the input device 706. For example, the input device 706 and display 708 may form a touch screen or similar touch-sensitive display. In other embodiments, the display 708 may be located near the input device 706.

The transceiver 710, in one embodiment, is configured to communicate wirelessly with Network Equipment 800. In certain embodiments, the transceiver 710 comprises a transmitter 712 and a receiver 714. The transmitter 712 is used to transmit UL communication signals to Network Equipment 800 and the receiver 714 is used to receive DL communication signals from Network Equipment 800. For example, the transmitter 712 may transmit a HARQ-ACK codebook including feedbacks for one or more DL transmissions. As another example, the receiver 714 may receive various configurations for the transmissions of HARQ-ACK codebook.

The transmitter 712 and the receiver 714 may be any suitable types of transmitters and receivers. Although only one transmitter 712 and one receiver 714 are illustrated, the transceiver 710 may have any suitable number of transmitters 712 and receivers 714. For example, in some embodiments, UE 700 includes a plurality of transmitter 712 and receiver 714 pairs for communicating on a plurality of wireless networks and/or radio frequency bands, each transmitter 712 and receiver 714 pair configured to communicate on a different wireless network and/or radio frequency band than the other transmitter 712 and receiver 714 pairs.

Figure 8:
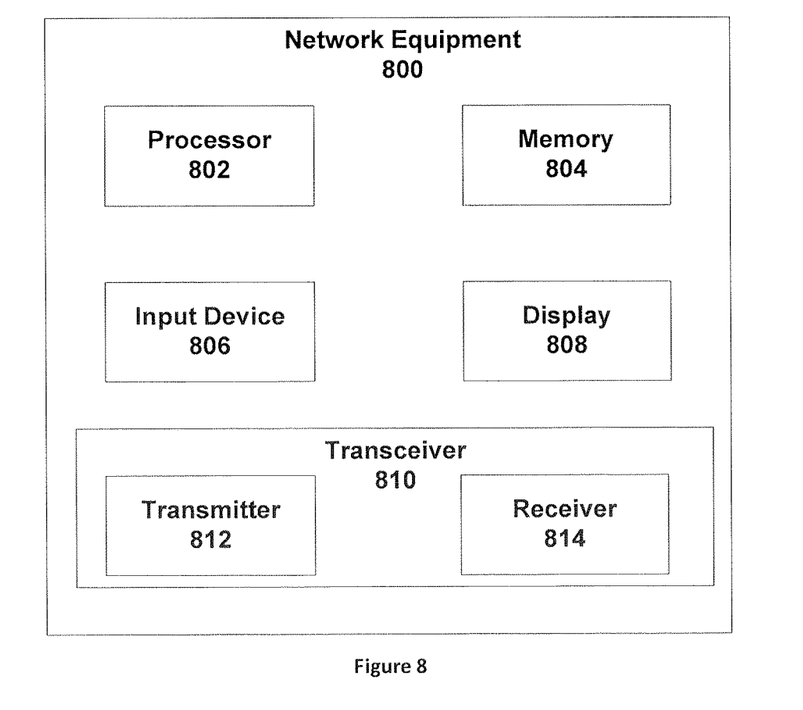
FIG. 8 is a schematic block diagram illustrating components of a network equipment according to one embodiment.

FIG. 8 is a schematic block diagram illustrating components of a network equipment according to one embodiment.

Network Equipment 800 includes one embodiment of gNB described from FIG. 1 to FIG. 6. Furthermore, Network Equipment 800 may include a processor 802, a memory 804, an input device 806, a display 808, and a transceiver 810. As may be appreciated, the processor 802, the memory 804, the input device 806, and the display 808 may be substantially similar to the processor 802, the memory 804, the input device 806, and the display 808 of UE 700, respectively.

In some embodiments, the processor 802 controls the transceiver 810 to transmit DL signals to UE 800. The processor 802 may also control the transceiver 810 to receive UL signals from UE 700. For example, the processor 802 may control the transceiver 810 to receive a HARQ-ACK codebook including feedbacks for one or more DL transmissions. In another example, the processor 802 may control the transceiver 810 to transmit a DL signals for various configurations to UE 700, as described above.

The transceiver 810, in one embodiment, is configured to communicate wirelessly with UE 700. In certain embodiments, the transceiver 810 comprises a transmitter 812 and a receiver 814. The transmitter 812 is used to transmit DL communication signals to UE 700 and the receiver 814 is used to receive UL communication signals from UE 700. For example, the receivers 814 may receive a HARQ-ACK codebook from UE 700. As another example, the transmitter 812 may transmit the various configurations of Network Equipment 800.

The transceiver 810 may communicate simultaneously with a plurality of UE 700. For example, the transmitter 812 may transmit DL communication signals to UE 700. As another example, the receiver 814 may simultaneously receive UL communication signals from UE 700. The transmitter 812 and the receiver 814 may be any suitable types of transmitters and receivers. Although only one transmitter 812 and one receiver 814 are illustrated, the transceiver 810 may have any suitable number of transmitters 812 and receivers 814. For example, Network Equipment 800 may serve multiple cells and/or cell sectors, wherein the transceiver 810 includes a transmitter 812 and a receiver 814 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a receiver that receives one or more downlink transmissions;
 a processor that:
  determines a first set of hybrid automatic repeat request-acknowledgment feedback timing values for generating a first hybrid automatic repeat request-acknowledgment codebook; and
  performs a first listen-before-talk for transmitting the first hybrid automatic repeat request-acknowledgment codebook in a first transmission opportunity, wherein the first hybrid automatic repeat request-acknowledgment codebook including the hybrid automatic repeat request-acknowledgment feedback corresponding to the one or more downlink transmissions; and a transmitter that transmits the first hybrid automatic repeat request-acknowledgment codebook in the first transmission opportunity in response to the first listen-before-talk being successful;

wherein the processor determines a second set of hybrid automatic repeat request-acknowledgment feedback timing values for generating a second hybrid automatic repeat request-acknowledgment codebook and performs a second listen-before-talk for transmitting the second hybrid automatic repeat request-acknowledgment codebook in a second transmission opportunity in response to the first listen-before-talk being unsuccessful, wherein the second hybrid automatic repeat request-acknowledgment codebook including the hybrid automatic repeat request-acknowledgment feedback corresponding to the one or more downlink transmissions, and a (n+1)th set of hybrid automatic repeat request-acknowledgment feedback timing values is updated by inserting values of $\{a+1, a+2, \ldots, a+x\}$ in a nth set of hybrid automatic repeat request-acknowledgment feedback timing values, wherein 'x' is a maximum value in the nth set and 'a' is a slot offset between two consecutive transmission opportunities for the hybrid automatic repeat request-acknowledgment feedback.

2. The apparatus according to claim 1, wherein a number of transmission opportunities for the hybrid automatic repeat request-acknowledgment feedback corresponding to the one or more downlink transmission is configured via radio resource control signaling.

3. The apparatus according to claim 2, wherein the first transmission opportunity is indicated by downlink control information.

4. The apparatus according to claim 1, wherein the first set of hybrid automatic repeat request-acknowledgment feedback timing values is configured via radio resource control signaling, and the second set of hybrid automatic repeat request-acknowledgment feedback timing values is updated by inserting additional values into the first set of hybrid automatic repeat request-acknowledgment feedback timing values.

5. The apparatus according to claim 1, wherein 'a' is greater than 1.

6. The apparatus according to claim 1, wherein multiple sets of hybrid automatic repeat request-acknowledgment feedback timing values are configured via radio resource control signaling and each set corresponds to one transmission opportunity.

7. The apparatus according to claim 1, wherein the second hybrid automatic repeat request-acknowledgment codebook is same with the first hybrid automatic repeat request-acknowledgment codebook and the codebook size is determined based on a size of the first set of hybrid automatic repeat request-acknowledgment feedback timing values and a number of transmission opportunities for the hybrid automatic repeat request-acknowledgment feedback.

8. The apparatus according to claim 1, wherein the hybrid automatic repeat request-acknowledgment feedback corresponding to the one or more downlink transmissions is provided with multiple transmission opportunities and only one hybrid automatic repeat request-acknowledgment feedback is allowed to be transmitted in each transmission opportunity.

9. A method comprises:
receiving one or more downlink transmissions;
determining a first set of hybrid automatic repeat request-acknowledgment feedback timing values for generating a first hybrid automatic repeat request-acknowledgment codebook;
performing a first listen-before-talk for transmitting the first hybrid automatic repeat request-acknowledgment codebook in a first transmission opportunity, wherein the first hybrid automatic repeat request-acknowledgment codebook including the hybrid automatic repeat request-acknowledgment feedback corresponding to the one or more downlink transmissions;
transmitting the first hybrid automatic repeat request-acknowledgment codebook in the first transmission opportunity in response to the first listen-before-talk being successful; and
determining a second set of hybrid automatic repeat request-acknowledgment feedback timing values for generating a second hybrid automatic repeat request-acknowledgment codebook and performing a second listen-before-talk for transmitting the second hybrid automatic repeat request-acknowledgment codebook in a second transmission opportunity in response to the first listen-before-talk being unsuccessful, wherein the second hybrid automatic repeat request-acknowledgment codebook including the hybrid automatic repeat request-acknowledgment feedback corresponding to the one or more downlink transmissions, and a (n+1)th set of hybrid automatic repeat request-acknowledgment feedback timing values is updated by inserting values of $\{a+1, a+2, \ldots, a+x\}$ in a nth set of hybrid automatic repeat request-acknowledgment feedback timing values, wherein 'x' is a maximum value in the nth set and 'a' is a slot offset between two consecutive transmission opportunities for the hybrid automatic repeat request-acknowledgment feedback.

10. An apparatus comprising:
a transmitter that transmits one or more downlink transmissions;
a processor that determines a plurality sets of hybrid automatic repeat request-acknowledgment timing values for receiving a plurality of hybrid automatic repeat request-acknowledgment codebooks in a plurality of transmission opportunities, wherein each of the plurality of hybrid automatic repeat request-acknowledgment codebooks includes the hybrid automatic repeat request-acknowledgment feedback corresponding to the one or more downlink transmissions, and a (n+1th set of hybrid automatic repeat request-acknowledgment feedback timing values is updated by inserting values of $\{a+1, a+2, \ldots, a+x\}$ in a nth set of hybrid automatic repeat request-acknowledgment feedback timing values, wherein 'x' is a maximum value in the nth set and 'a' is a slot offset between two consecutive transmission opportunities for the hybrid automatic repeat request-acknowledgment feedback; and
a receiver that attempts to receive the corresponding hybrid automatic repeat request-acknowledgment codebook from a first transmission opportunity towards the last transmission opportunity within the plurality of transmission opportunities until successful reception of the corresponding hybrid automatic repeat request-acknowledgment codebook.

11. The apparatus according to claim 10, wherein the transmitter further transmits a signaling indicating a number of transmission opportunities for the hybrid automatic repeat request-acknowledgment feedback.

12. The apparatus according to claim 10, wherein the transmitter further transmits a signaling indicating the first transmission opportunity of the plurality of transmission opportunities.

13. The apparatus according to claim 10, wherein the transmitter further transmits a signaling indicating a first set of hybrid automatic repeat request-acknowledgment feedback timing values of the plurality sets of hybrid automatic repeat request-acknowledgment feedback timing values.

14. The apparatus according to claim 13, wherein a second set of hybrid automatic repeat request-acknowledgment feedback timing values is updated by inserting additional values into the first set of hybrid automatic repeat request-acknowledgment feedback timing values.

15. The apparatus according to claim 10, wherein 'a' is greater than 1.

16. The apparatus according to claim 10, wherein the transmitter further transmits a signaling indicating the plurality sets of hybrid automatic repeat request-acknowledgment feedback timing values and each set corresponds to one transmission opportunity.

17. The apparatus according to claim 10, wherein the plurality of hybrid automatic repeat request-acknowledgment codebooks are same and the codebook size is determined based on a size of a first set of hybrid automatic repeat request-acknowledgment feedback timing values in the plurality sets of hybrid automatic repeat request-acknowledgment feedback timing values and a number of transmission opportunities for the hybrid automatic repeat request-acknowledgment feedback.

18. The apparatus according to claim 10, wherein the hybrid automatic repeat request-acknowledgment feedback corresponding to the one or more downlink transmissions is provided with multiple transmission opportunities and only one hybrid automatic repeat request-acknowledgment feedback is allowed to be transmitted in each transmission opportunity.

* * * * *